United States Patent [19]
Land et al.

[11] 3,824,611
[45] July 16, 1974

[54] TEMPERATURE RESPONSIVE IMITATING APPARATUS FOR A PHOTOGRAPHIC CAMERA

[75] Inventors: Edwin H. Land, Cambridge; David V. Cronin, Peabody, both of Mass.

[73] Assignee: Polaroid Corporation, Cambridge, Mass.

[22] Filed: Dec. 26, 1972

[21] Appl. No.: 318,228

[52] U.S. Cl. .................. 354/202, 354/266, 200/157
[51] Int. Cl. ............................................ G03b 17/00
[58] Field of Search ................ 95/11 R, 54, 1 R; 200/33 R, 61.04, 157

[56] References Cited
UNITED STATES PATENTS
530,486  12/1894  Jensen ................................. 95/54

*Primary Examiner*—Robert P. Greiner
*Attorney, Agent, or Firm*—William A. Danchuk

[57] ABSTRACT

An exposure actuation system, preferably including an electric start switch for a photographic camera including a movable actuator button which is operative to initiate a photographic exposure only at predetermined temperatures. Depression of the movable actuator button is operative to move one electrical spring contact into electrical engagement with another spring contact for closing appropriate camera shutter circuitry. In a preferred embodiment, a liquid-filled elastic member is interposed in the path of movement of the subject actuator button. Should the photographic camera be subjected to temperatures below the freezing point of the liquid, the liquid freezes and prevents depression of the actuator button.

12 Claims, 4 Drawing Figures

3,824,611

TEMPERATURE RESPONSIVE IMITATING APPARATUS FOR A PHOTOGRAPHIC CAMERA

BACKGROUND OF THE INVENTION

The taking of photographs is influenced in many ways by temperature during various stages of camera usage and film development. This dependency is especially important in the exposure of photographs of the self-developing variety. Specifically, it is the temperature of the self-developing film during development that is important. In cold weather, the camera user can step out of a warm house or car to snap a picture, immediately returning to the warm place for the development of his picture. However, if the temperature of the camera and film during development is below a predetermined temperature, an inadequately developed picture may result. Moreover, if the temperature conditions are severe enough, no development may be possible. Therefore, users are usually instructed not to use the film under temperature conditions in which the film unit would not provide acceptable results.

In addition to the temperature influence on photographic films, there may be a similar influence on the mechanical components of both still and motion picture cameras. With regard to still cameras, the temperature effect is related to the film transport and exposure systems. The oil used to lubricate various elements within the transport system becomes more viscous when subjected to cold. As such, damage to the system becomes likely when the camera is subjected to undesired low temperatures and actuation of the same is attempted. With regard to motion picture cameras, temperature effects are particularly related to the responsiveness of the power source incorporated within these cameras. In particular, the effective voltage produced by a battery is directly proportional to the temperature at which the battery is operated. Accordingly, as the camera and battery are subjected to severe cold, the latter produces voltages at decreased levels. This decrease in battery voltage may render the camera inoperative.

SUMMARY OF THE INVENTION

The present invention is addressed to a temperature dependent shutter actuation system, particularly an electric start switch, for a photographic camera, the operability thereof being a function of the ambient temperature. The start switch includes a movable actuator button which, when depressed, is operative to move one spring contact into electrical engagement with another for closing appropriate shutter circuitry. In one preferred embodiment, a liquid-filled elastic member is interposed in the path of the actuator button as it is depressed. Under normal temperature conditions, the liquid-filled member complies elastically with the actuation force on the actuator button and a picture-taking cycle proceeds normally. Should the temperature conditions be at or below freezing point of the film unit and the camera and film are both very cold, then the liquid-filled elastic member freezes thereby preventing normal depression of the actuator button.

Although various liquids may be employed, it is obviously desirable to use a liquid whose freezing point is somewhat higher than that of the processing composition. As a result, the camera is inactuated at the same temperature at which the processing composition in the film unit becomes temporarily frozen. Additionally, a liquid may be employed which exhibits an increasing viscosity with decreased temperature. As such, there would be an increased resistance within the liquid itself which would be capable of preventing actuation, or at least making actuation so difficult that the camera user would be prevented from actuating an exposure at lower temperatures. The broad inventive concept of preventing actuation of a camera when the ambient temperature is outside a predetermined temperature range is not our joint invention and is not the subject of the present application, but was derived prior to the filing date of the instant application from Edwin H. Land and is the subject matter of the invention disclosed and claimed in application Ser. No. 338,322 filed by Edwin H. Land on Mar. 5, 1973, said application Ser. No. 338,322 being assigned to the assignee of the instant application.

OBJECTS OF THE INVENTION

It is a general object and feature of the present invention to provide a temperature responsive start switch for a photographic camera for rendering the camera temporarily inoperable below a certain predetermined temperature.

It is another object and feature of this invention to provide a temperature responsive start switch for a photographic camera characterized in having a flexible liquid-filled member, the freezing point of which is not less than the temperature at which film within the camera would not give useful results.

Further objects and advantages of the invention will in part be obvious and will in part become apparent as the following description proceeds. The features of novelty which characterize the invention will be pointed out with particularity in the claims annexed to and forming a part of this specification.

DETAILED DESCRIPTION OF THE DRAWINGS

Figure 1:
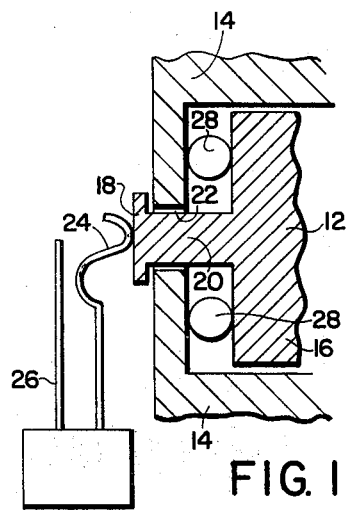
FIG. 1 is a sectional view of the apparatus of the present invention.

Referring to FIG. 1, there is shown a temperature responsive start switch 10 for a photographic camera according to the present invention. An actuator button 12 for switch 10 is movably mounted within a housing 14 formed as part of a camera (not shown). Button 12 is formed with a relatively large outer portion 16 and a relatively small inner portion 18. A connecting portion 20 of button 12 connects portions 16 and 18 and extends through a bore 22 formed within housing 14. Inner portion 18 is configured having a diameter larger than that of bore 22 thereby preventing the extraction of button 12 from housing 14.

Figure 2:
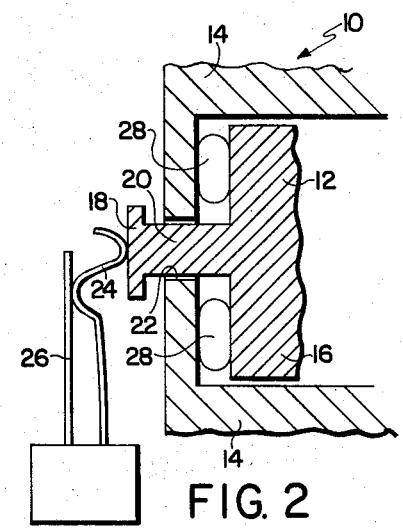
FIG. 2 is the apparatus of FIG. 1 during one stage of its operation.

Positioned behind housing 14 are a pair of contacts 24 and 26. Contacts 24 and 26 are operative to connect appropriate exposure control circuitry (not shown) within the camera with an electrical power source (not shown) to initiate a photographic exposure. As such, contacts 24 and 26 act as a switch. Contact 24 is flexible in nature and is capable of being moved by button 12 into contact with contact 26, the latter contact being stationary. This "closed" position is best shown in FIG. 2.

Positioned between outer portion 16 of button 12 and housing 14 is a toroid shaped elastic member 28. Member 28 is filled with a liquid which has a predetermined freezing point. Due to the possibility of interchanging member 28 with various different liquids, member 28 may have any one of several freezing points. At normal temperatures, member 28 retains its elasticity and easily complies with the actuation force on actuator button 12. The form to which member 28 is transformed during actuation is best shown in FIG. 2.

With the configuration shown, actuator button 12 is automatically returned to its starting position (see FIG. 1) by forces derived from flexible contact 24 and from liquid filled member 28 returning to their unstressed positions. The operation of switch 10 will function as described under temperatures above that of the predetermined freezing point of the liquid employed within member 28.

When the temperature to which switch 10 is subjected falls below the predetermined freezing point of the liquid, however, switch 10 becomes inoperative. The liquid freezes, solidifying member 28, thereby preventing the latter's elastic compliance with an actuating force on button 12. As such, actuator button 12 is retained in its outwardmost position and switch 10 remains open. No camera actuation may now take place. When the temperature rises, the frozen liquid melts and normal camera actuation is possible.

Figure 3:
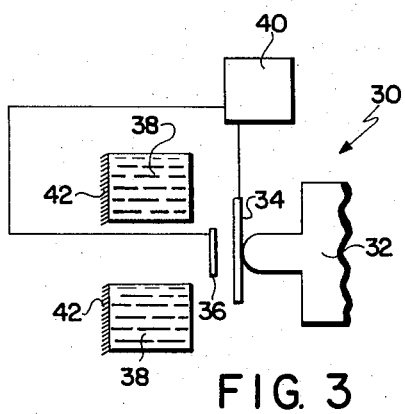
FIG. 3 is a schematic view of a second embodiment of the present invention.
Figure 4:
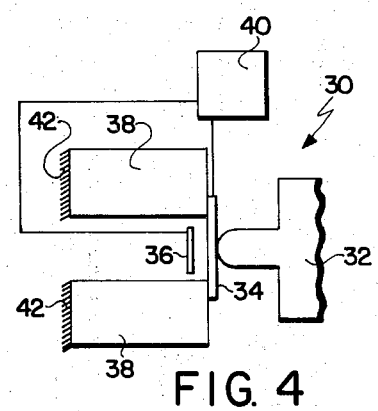
FIG. 4 is the apparatus of FIG. 3 during one stage of its operation.

A second embodiment of the present invention is shown in FIGS. 3 and 4. Looking to FIG. 3, there is disclosed a switch shown generally at 30. Switch 30 is configured having a movable actuator button 32, a pair of electrical contacts 34 and 36, and a liquid-filled toroidal shaped member 38. Button 32 is similar to the actuator button 12 in the first embodiment shown and may be mounted similarly although no structure for such a mounting is shown. Located directly behind button 32 is contact 34. Depression of button 32 moves contact 34 into electrical connection with contact 36 the latter being held stationary. The electrical connection between contacts 34 and 36 closes appropriate camera circuitry representively denoted by box 40. As may be readily evidenced from FIG. 3, liquid-filled member 38 does not interfere with the electrical connection described above. However, when the temperature falls below a predetermined point the liquid contained within member 38 freezes and expands. Due to the stretchable nature of member 38, the expanded liquid is contained within member 38. As the freezing liquid expands, member 38 is expanded outwardly from a wall structure 42. As this expansion proceeds, contact 36 falls behind the forwardmost portion of member 38. This position can be best seen by referring to FIG. 4. When the liquid is completely frozen and expanded, member 38 prevents electrical connection between contacts 34 and 36. Accordingly, camera actuation is temporarily prevented and possible poor photographs or damage to specific camera elements is avoided.

The selection of specific liquids for use within members 28 and 38 depends upon the temperature at which deactuation of the camera start switch is desired. For many circumstances, water would be suitable. However, should deactuation be desired to be only at temperatures below 0° C, solutions having various degrees of salinity may be incorporated within members 28 and 38. If saline solutions are undesirable, e.g., because of possible corrosion, other aqueous or organic solutions may be selected by routine experimentation as having the desired freezing point.

As may be evidenced from the foregoing, the temperature dependent switch of the invention provides the capability of preventing camera actuation under specific temperature conditions. The switch employs a liquid-filled elastic member which, when frozen, prevents the movement of one electrical contact into electrical connection with another contact. While the two embodiments shown are based upon an electrical system, it should be obvious to those skilled in the art that the basic principles of the switch disclosed may be applied to a mechanical system. Accordingly, the switch would prevent mechanical actuation of a camera when temperatures fall below a predetermined level. In both the electrical and mechanical systems, however, possible damage to the camera components would be alleviated.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A temperature dependent shutter release for a photographic camera, said temperature dependent shutter release comprising:
   a housing;
   actuator means extending through said housing, said actuator means being movable between a first position in which said shutter release is open and a second position in which said shutter release is closed; and
   liquid-filled means operative to prevent said actuator means from moving from said first position to said second position when the temperature of said liquid-filled means is below a predetermined position, said liquid-filled means being formed as an elastic toroidal shaped member having a quantity of liquid contained therein, said elastic toroidal shaped member being positioned between said housing and said actuator means.

2. The temperature dependent shutter release of claim 1 in which said liquid contained within said elastic toroidal shaped member is selected having a predetermined freezing point, said elastic toroidal shaped member being operative to prevent said movement of said actuator means from said first position to said second position when said photographic camera is subjected to temperatures below said predetermined freezing point of said liquid.

3. The temperature dependent shutter release of claim 2 in which said elastic toroidal shaped member is operative to comply with said movement of said actuator means from said first position to said second position when said photographic camera is subjected to temperatures above said predetermined freezing point of said liquid.

4. The temperature dependent shutter release of claim 3 in which said liquid contained within said elastic toroidal shaped member is an aqueous solution.

5. The temperature dependent shutter release of claim 4 in which said liquid contained within said elastic toroidal shaped member is a saline solution.

6. A temperature dependent shutter release for a photographic camera, said temperature dependent shutter release comprising:
   a housing;
   actuator means movable between a first position in which said shutter release is in a pre-exposure status and a second position in which said shutter release initiates a photographic exposure; and
   liquid-filled means including a liquid contained therein having a predetermined freezing point, said liquid-filled means being operative to prevent the movement of said actuator means from said first position to said second position when said photographic camera is subjected to temperatures below said predetermined freezing point of said liquid.

7. The temperature dependent shutter release of claim 6 in which said liquid-filled means is operative to elastically comply with said movement of said actuator means from said first position to said second position when said camera is subjected to temperatures above said predetermined freezing point of said liquid.

8. The temperature dependent shutter release of claim 7 in which said liquid contained within said liquid-filled means is an aqueous solution.

9. The temperature dependent shutter release of claim 8 in which said ilquid contained within said liquid-filled means is a saline solution.

10. The temperature dependent shutter release of claim 6 in which said liquid-filled means is formed as an elastic toroidal shaped member having a quantity of liquid contained therein, said elastic toroidal shaped member being positioned between said housing and said actuator means.

11. A temperature dependent shutter release for a photographic camera, said temperature dependent shutter release comprising:
   a housing;
   actuator means movable between a first position in which said shutter release is in a pre-exposure condition and a second position in which said shutter release initiates a photographic exposure;
   contact means positioned in the path of movement of said actuator means, at least one of said contact means being movable in response to said actuator means movement for opening an electrical circuit when said actuator means is in its said first position and being further movable to close said electrical circuit when said actuator means is in its said second position; and
   liquid-filled means operative to prevent said actuator means from moving from said first position to said second position when the temperature of said liquid-filled means is below a predetermined value.

12. A photographic camera for mounting a film unit at a focal plane, for subsequently exposing the film unit and then processing the film unit, the film unit being of a self-developing type having a photosensitive sheet and a pod of processing fluid suitable to be distributed across the photosensitive sheet after its exposure to facilitate the development of a viewable image, the processing fluid within the pod being substantially inoperative for such processing at temperatures below a given temperature, said camera including:
   actuator means movable between a first position and a second position;
   means responsive to the movement of said actuator means from its said first position to its said second position for initiating a function of said camera; and
   liquid-filled means operative to prevent said actuator means from moving from its said first position to its said second position when the temperature of said liquid-filled means is below said given temperature, said liquid-filled means being located in the path of movement of at least a portion of said actuator means when said actuator means is moved from its said first position towards its said second position.

* * * * *

UNITED STATES PATENT OFFICE
CERTIFICATE OF CORRECTION

Patent No. 3,824,611              Dated July 16, 1974

Inventor(s) Edwin H. Land and David V. Cronin

It is certified that error appears in the above-identified patent and that said Letters Patent are hereby corrected as shown below:

In the Title, change "IMITATING" to --INITIATING--.

Signed and sealed this 29th day of October 1974.

(SEAL)
Attest:

McCOY M. GIBSON JR.
Attesting Officer

C. MARSHALL DANN
Commissioner of Patents